(12) United States Patent
Cervantes et al.

(10) Patent No.: US 10,110,441 B2
(45) Date of Patent: Oct. 23, 2018

(54) NETWORK IDENTIFIER TRANSLATION (71) Applicant: International Business Machines Corporation, Armonk, NY (US)

(72) Inventors: Ezequiel Cervantes, Tucson, AZ (US); David J. Gimpl, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1245 days.

(21) Appl. No.: 14/228,399

(22) Filed: Mar. 28, 2014

(65) Prior Publication Data

US 2015/0281061 A1 Oct. 1, 2015

(51) Int. Cl.
*G06F 15/16* (2006.01)
*H04L 12/24* (2006.01)
*H04L 29/06* (2006.01)
*H04L 29/12* (2006.01)

(52) U.S. Cl.
CPC .............. *H04L 41/22* (2013.01); *H04L 29/06* (2013.01); *H04L 41/0856* (2013.01); *H04L 61/103* (2013.01)

(58) Field of Classification Search
CPC ......................... H04L 29/08072; H04L 29/06
USPC ................. 709/220, 223, 224, 232
See application file for complete search history.

(56) References Cited

U.S. PATENT DOCUMENTS

| 6,779,020 | B1* | 8/2004 | Henrick | H04L 29/06 370/352 |
|---|---|---|---|---|
| 7,017,162 | B2* | 3/2006 | Smith | G06F 9/465 719/315 |
| 7,096,278 | B2* | 8/2006 | Fraser | G06K 19/077 455/558 |
| 7,117,504 | B2* | 10/2006 | Smith | G06F 8/20 709/201 |
| 7,209,964 | B2* | 4/2007 | Dugan | H04M 3/42136 379/221.08 |
| 7,421,391 | B1* | 9/2008 | Merkel | G06Q 30/02 704/270 |
| 7,644,414 | B2* | 1/2010 | Smith | G06F 8/20 709/201 |
| 8,387,013 | B2 | 2/2013 | Iyoda et al. | |
| 2012/0254976 | A1 | 10/2012 | Armstrong et al. | |
| 2013/0268635 | A1 | 10/2013 | Richardson et al. | |
| 2017/0147681 | A1* | 5/2017 | Tankersley | G06F 17/30525 |

* cited by examiner

*Primary Examiner* — Khanh Dinh
(74) *Attorney, Agent, or Firm* — Zilka-Kotab, P.C.

(57) ABSTRACT

Translating an identifier is provided. One or more processors receives text that includes a portion of text. One or more processors identifies an identifier of an element of a network, wherein identifying the element is based, at least in part, on the portion of text. One or more processors determines one or more details of the element, wherein determining the one or more details is based, at least in part, on the identifier. One or more processors modifies a presentation of the text, wherein modifying the presentation is based, at least in part, on the one or more details of the element.

18 Claims, 4 Drawing Sheets

NETWORK IDENTIFIER TRANSLATION

FIELD OF THE INVENTION

The present disclosure relates generally to the field of computer networks, and more particularly to network identifier translation.

BACKGROUND OF THE INVENTION

A network of computing devices uses network identifiers to identify communication ports by which the computing devices connect to the network. The network identifiers are often long, alphanumeric strings. The type of network identifier used depends upon the type of network. For example, an Ethernet network uses media access control (MAC) addresses, while a fibre channel network uses world wide port name (WWPN) addresses.

An element management system (EMS) manages one or more devices on a network. Each device can be physical or virtual and is called a network element. Each network element can include one or more devices connected to the network by a communication port, which is identified by a network identifier. The EMS can track network identifiers of the network elements, and can report the network elements to a user.

SUMMARY

Embodiments of the present invention provide a method, system, and program product to translate an identifier. One or more processors receives text that includes a portion of text. One or more processors identifies an identifier of an element of a network, wherein identifying the element is based, at least in part, on the portion of text. One or more processors determines one or more details of the element, wherein determining the one or more details is based, at least in part, on the identifier. One or more processors modifies a presentation of the text, wherein modifying the presentation is based, at least in part, on the one or more details of the element.

DETAILED DESCRIPTION

Embodiments of the present disclosure recognize that network identifiers can be difficult for a user to remember, recognize, or otherwise effectively utilize. The user may be a system administrator or other user of an EMS.

Embodiments of the present disclosure provide for network identifier translation. In one embodiment, a network identifier is identified. Based on the network identifier, element details are retrieved from a database. The element details are presented in place of (or along with) the network identifier, which may be an alphanumeric value. The element details may be information with higher usability, readability, or semantic meaning for a user compared to the network identifier. Thus, embodiments of the present disclosure translate network identifiers to improve the ability of a user to understand and use the translated network identifiers. Further provided is implementing such techniques using a plug-in for a web browser or other program that displays details of network elements.

Figure 1:
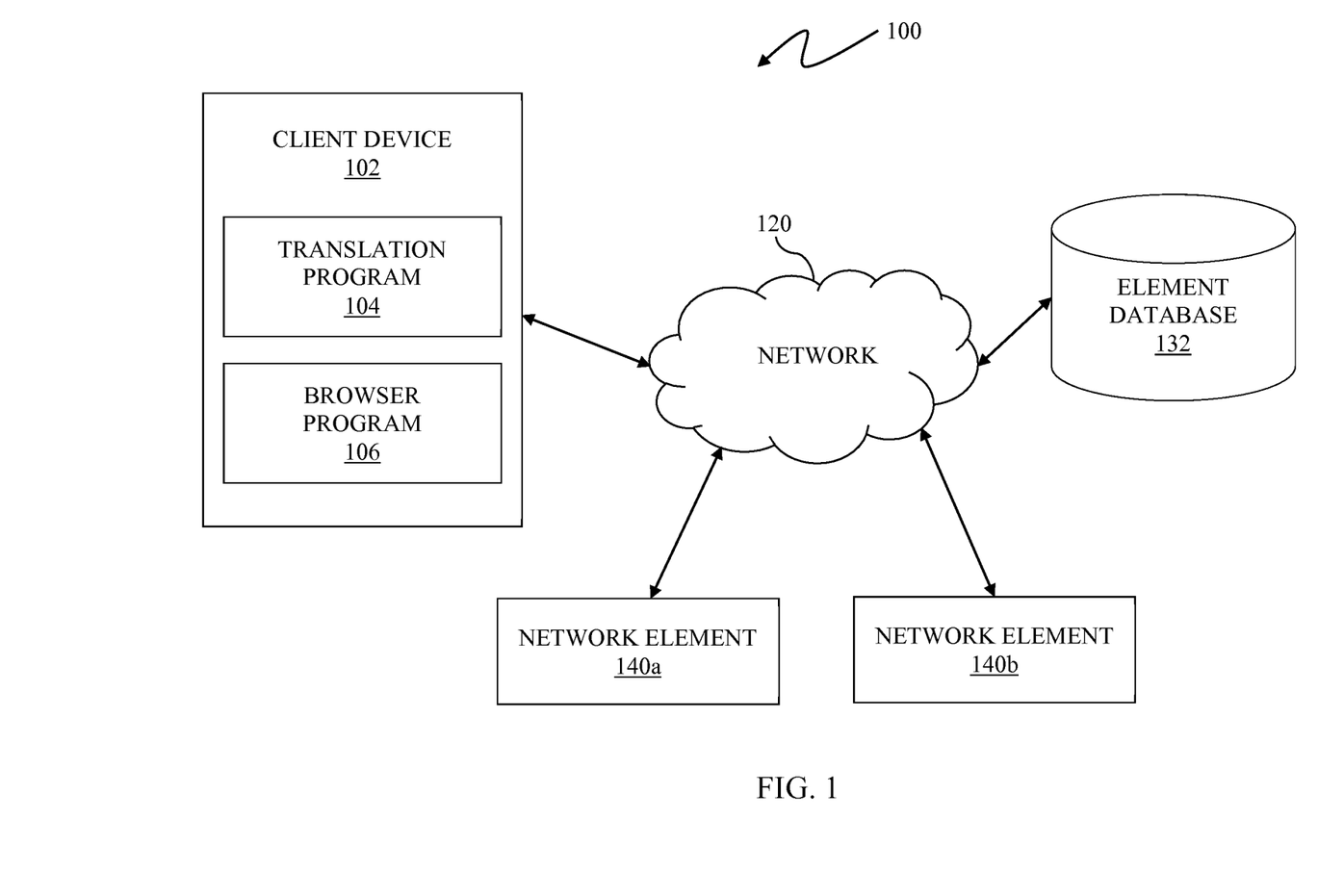
FIG. 1 is a functional block diagram illustrating a network environment, in accordance with an embodiment of the present disclosure.

The present disclosure will now be described in detail with reference to the Figures. FIG. 1 is a functional block diagram illustrating a networking environment, generally designated 100, in accordance with one embodiment of the present disclosure. Networking environment 100 includes client device 102, element database 132, and network elements 140a and 140b (collectively, network elements 140), all connected over network 120.

In various embodiments of the present invention, each of client device 102 and network elements 140 are a respective computing device that can be a standalone device, a server, a laptop computer, a tablet computer, a netbook computer, a personal computer (PC), or a desktop computer. In various other embodiments, each of network elements 140 may be a respective computing device that can be a networking device (e.g., a switch or a router), a storage device (e.g., a network-attached storage device or data store), a client device (e.g., client device 102), or any other logical element manageable by an element management system. In another embodiment, each of client device 102 and network elements 140 represent a respective computing system utilizing clustered computers and components to act as a single pool of seamless resources. In general, each of client device 102 and network elements 140 can be any respective computing device or a combination of devices with access to each other, and with access to and/or capable of executing some or all of translation program 104, browser program 106, and element database 132. Client device 102 may include internal and external hardware components, as depicted and described in further detail with respect to FIG. 5.

Client device 102 includes translation program 104 and browser program 106. In the depicted embodiment, each of translation program 104 and browser program 106 is stored on client device 102. However, in other embodiments, translation program 104 may be stored externally and accessed through a communication network, such as network 120. Network 120 can be, for example, a local area network (LAN), a wide area network (WAN) such as the Internet, or a combination of the two, and may include wired, wireless, fiber optic or any other connection known in the art. In general, network 120 can be any combination of connections and protocols that will support communications between client device 102, element database 132, and network elements 140.

Translation program 104 operates to translate a network identifier. A network identifier is a code, character or series of characters, symbol or series of symbols, portion of text, or other identifier that identifies a network element. In various examples, a network identifier can be a world-wide name (WWN), world-wide port name (WWPN), a media access control (MAC) address, or other type of identifier of a device, network port, or network element. Translation program 104 obtains text. Translation program 104 interprets the text. Translation program 104 identifies a network identifier. Translation program 104 obtains element details based on the network identifier. Translation program 104 presents the element details. In one embodiment, translation program 104 resides on client device 102. In other embodiments, translation program 104 may reside on another computing device, provided that translation program 104 can access and is accessible by at least browser program 106, client device 102, and element database 132.

Browser program 106 operates to provide (e.g., by a user interface) text that can include one or more network identifiers. Browser program 106 may be a web browser, a file browser, a network browser, or any other program configured to provide information regarding one or more of network elements 140. For example, browser program 106 may be any of various commercially-available web browsers. Translation program 104 may be a plug-in designed to extend the functionality of browser program 106. Alternatively, translation program 104 may be a program independent of, but in communication with, browser program 106. In one embodiment, browser program 106 resides on client device 102. In other embodiments, browser program 106 may reside on another computing device, provided that browser program 106 can access and is accessible by at least translation program 104, client device 102, and element database 132.

Element database 132 is a data repository that may be accessed by and that may access one or both of translation program 104 and browser program 106. Element details for one or more network elements (e.g., network elements 140) may be stored to element database 132. Element database 132 may be a network element database maintained by an EMS. Element details of a network element include information describing or relating to the network element such as, for example, a user-designated machine name, a network address, a resource path, a port name, or other information of semantic value to a user. In some embodiments, element database 132 may be written to and read by programs and entities outside of distributed networked environment 100 in order to populate element database 132 with element details. For example, element database 132 may be written to and/or read by an EMS, and/or by a user (e.g., of an EMS). In one embodiment, element database 132 resides on a computing device that is in communication with network 120. For example, element database 132 may reside on an EMS server. In other embodiments, element database 132 may reside on another computing device, client device 102, or a network element, provided that element database 132 is accessible to translation program 104 and browser program 106.

In one example, a user of client device 102 utilizes an EMS interface to request information regarding one or more network elements (e.g., network element 140a or 140b). Translation program 104 receives text for presentation by a user interface. The text includes a portion of text such as "AB:CD:EF:11:22:33". Translation program 104 identifies a network identifier (in this case, a MAC address) within the portion of text. Translation program 104 accesses element database 132 based on the network identifier. Translation program 104 receives element details of a network element. The element details include the user-designated machine name "MainServer" and the IP address "192.168.1.205". Translation program 104 modifies the text based on the element details. Client device 102 presents the text with the element details to the user.

Figure 2:
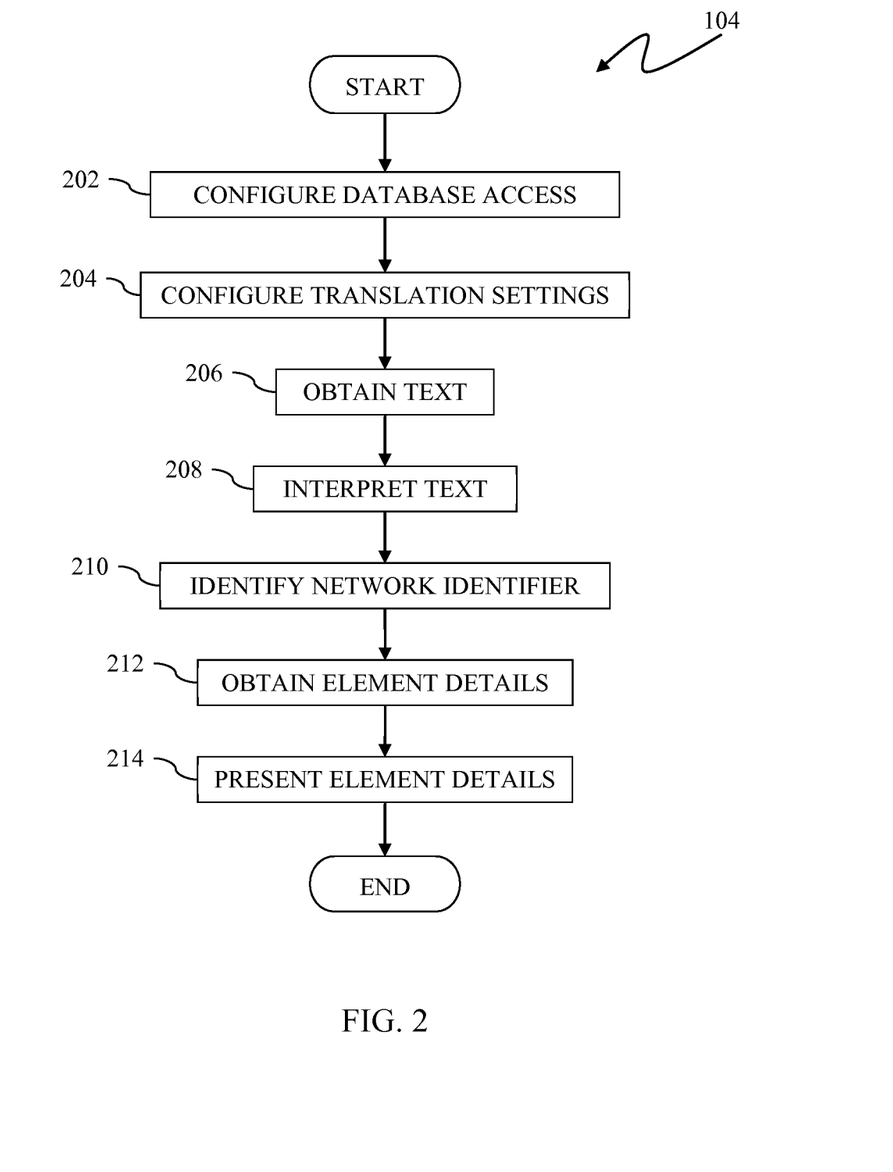
FIG. 2 is a flowchart depicting operations of a translation program, on a computing device within the network environment of FIG. 1, in accordance with an embodiment of the present disclosure.
Figure 3:
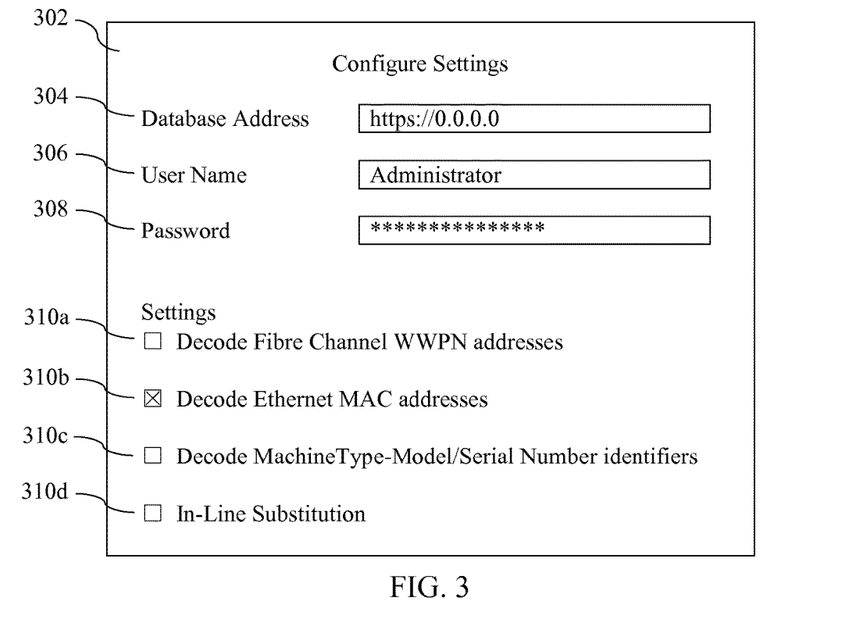
FIG. 3 depicts an illustrative embodiment of a user interface of a translation program, in accordance with an embodiment of the present disclosure.

FIG. 2 is a flowchart depicting operations of translation program 104, in accordance with an embodiment of the present disclosure. The following discussion includes references to each of FIGS. 2 and 3. FIG. 3 depicts an illustrative embodiment of a user interface of a translation program, in accordance with an embodiment of the present disclosure.

In step 202, translation program 104 configures database access. Translation program 104 may configure access to element database 132. Element database 132 may be protected by one or more layers of authentication that limit unauthorized access. Translation program 104 may configure access to element database 132 based on a set of access parameters. The access parameters may include a database location, authentication credentials, or a combination thereof. Translation program 104 may receive the authentication credentials as user input from a user of client device 102. The authentication credentials may include a user name, a password, or a combination thereof. Alternatively, the authentication credentials may include any of myriad authentication mechanisms that verify (or authenticate) the identity of a user requesting access. The access parameters may include a database location, which is an address at which the database is accessible by, for example, translation program 104. In various examples, the database location may be a network identifier, an internet protocol (IP) address, a network path, or a uniform resource locator (URL) address.

In the illustrative embodiment of FIG. 3, translation program 104 provides user interface 302, which includes multiple user interface ("UI") elements. The UI elements include database address field 304, user name field 306, password field 308, and settings fields 310a, 310b, 310c, and 310d (collectively referred to as settings fields 310). UI 302 may include additional UI elements (not shown) that, for example, save or discard changes made to a UI element. Translation program 104 can receive user input in response to a user interaction with a UI element. Translation program 104 configures database access based on access parameters received via UI elements database address field 304, user name field 306, and password field 308. Translation program 104 receives a database location via database address field 304. Translation program 104 receives a user name via user name field 306. Translation program 104 receives a password via password field 308. In this illustrative embodiment, translation program 104 configures access to element database 132 using "https://0.0.0.0" as the database location, "Administrator" as the user name, and characters represented by the mask displayed by password field 308 as the password.

In step 204, translation program 104 configures translation settings. The translation settings may control one or more functions of translation program 104. For example, the translation settings may control which types of network identifiers are translated, what element details to present, the method of presenting the element details, or other functions. Each translation setting has a default state, which translation program 104 can modify (i.e., configure) based on user input. For example, translation program 104 may include a setting that controls whether to translate Ethernet MAC addresses, which may be enabled by default. Translation program 104 may configure the setting by disabling it, based on user input. For example, translation program 104 may receive user input that includes a selection that identifies Ethernet MAC addresses as a type of network identifier to translate. In some embodiments, the translation settings include settings that control what element details are presented and how the element details are presented. Presentation of the element details is discussed below.

In the illustrative embodiment of FIG. 4, translation program 104 configures translation settings based on settings fields 310. Settings fields 310a, 310c, and 310d are disabled, while settings field 310b is enabled. Based on the values of each of settings field 310a, 310b, and 310c, translation program 104 enables or disables translation of the network identifier identified by the settings field. Based on the value of settings field 310d, translation program 104 enables or disables in-line substitution of element details (discussed more fully below).

In step 206, translation program 104 obtains text. Translation program 104 may receive text from browser program 106. For example, browser program 106 may be a web browser that receives text in hypertext markup language (HTML) format in order to present a webpage. In this case, translation program 104 may be implemented as a plug-in for browser program 106 that intercepts the HTML text received by browser program 106. In another example, translation program 104 may receive the text from browser program 106 in response to browser program 106 receiving the text. Alternatively, translation program 104 may obtain the text by sending a request to browser program 106. Alternatively, translation program 104 may obtain the text from a source other than browser program 106, such as a computing device communicatively connected to translation program 104 via network 120. Alternatively, translation program 104 may receive the text in response to a user interaction. Generally, browser program 106 is any program capable of presenting text that includes a network identifier of a network element.

In step 208, translation program 104 interprets the text. Translation program 104 may interpret the text by determining a format or structure of the text. In various embodiments, the text may be unstructured text, semi-structured text, or structured text. In various examples, the text may be a website, an email, a representation of the topology of a network (e.g., network 120), a document, or any other text that can include a network identifier. The text may comply with one or more formatting conventions. For example, the text may comply with formatting conventions such as HTML, extensible markup language (XML), portable document format (PDF), or a combination thereof.

In some embodiments, translation program 104 interprets text depicted by an image by extracting the text from the image using optical character recognition (OCR). For example, translation program 104 may obtain text by receiving a scanned document from a peripheral device. Translation program 104 performs OCR on the scanned document to extract text. Translation program 104 interprets the extracted text.

In step 210, translation program 104 identifies a network identifier. In some embodiments, translation program 104 may identify a network identifier by utilizing one or more natural language processing (NLP) techniques. Translation program 104 may utilize NLP to identify a network identifier in semi-structured text. Alternatively, translation program 104 may utilize NLP to identify a network identifier in unstructured text, or text extracted by OCR. For example, translation program 104 may identify a network identifier in the string "The serial number is 12345" by utilizing NLP to identify "12345" as a serial number, which is a type of network identifier.

In some embodiments, translation program 104 identifies a network identifier by matching a portion of the received text to a regular expression that represents a format of the network identifier. For example, translation program 104 may identify a MAC address based on the regular expression "^([0-9A-F]{2}[:-]){5}([0-9A-F]{2})$" and a string (i.e., a portion of the received text) such as "A1:B2:C3:D4:E5:F6". Translation program 104 may include one or more regular expressions that each correspond to the format of a type of network identifier.

In some embodiments, translation program 104 identifies types of network identifiers based on the translation settings. For example, translation program 104 identifies network identifiers of types that are enabled, according to the translation settings.

In some embodiments, translation program 104 identifies network identifiers based on tags, identifiers, or other structures of structured or semi-structured text. For example, translation program 104 may identify a WWPN network identifier based on the XML string "<WWPN>1234567812345678</WWPN>" in which the <WWPN> tag is a tag that identifies "1234567812345678" as a WWPN address.

In some embodiments, translation program 104 utilizes a combination of the above techniques. For example, translation program 104 may utilize NLP on the string "MAC: A111:B2:C3:D4:E5:F6" to identify the sub-string "A111:B2:C3:D4:E5:F6" as a possible MAC address. In response to determining that sub-string fails to conform to the format of a MAC address, translation program 104 may determine that the sub-string is not a MAC address.

In some embodiments, translation program 104 identifies a network identifier based on user input. Translation program 104 may receive a user interaction that identifies a portion of the obtained text. The user interaction may be an interaction with a context menu that is associated with a portion of the obtained text representing a network identifier. The context menu may be a UI element generated by client device 102 in response to a user interaction with browser program 106. In one example, browser program 106 includes a UI that presents a webpage that includes a network identifier. A user of client device 102 performs a right click mouse operation on the network identifier. In response, client device 102 generates a context menu within the UI of browser program 106. The user performs a mouse operation on the context menu. In response, translation program 104 identifies the network identifier.

In step 212, translation program 104 obtains element details. Translation program 104 may obtain element details by receiving the element details from a database. For example, translation program 104 may query element database 132 based on the network identifier and, in response, receive the element details. Alternatively, translation program 104 may obtain the element details from another computing device (e.g., some or all of network elements 140). Alternatively, translation program 104 may generate the element details by decoding the network identifier. Translation program 104 may decode a network identifier based on one or more pre-determined formatting conventions. For example, a WWPN may comply with a formatting convention in which the first four characters are "1000" and the next six characters represent a name of an organization. Translation program 104 may decode the WWPN, in part, by determining the name of the organization represented. Alternatively, translation program 104 may obtain the element details as user input.

In some embodiments, translation program 104 obtains element details based, at least in part, on a configuration setting. The configuration setting may identify a database location of a database that stores element details. For example, the configuration setting may identify database location of element database 132. In various embodiments, translation program 104 may obtain some or all of the types of element details corresponding to a network identifier. A configuration setting may identify one or more types of element details. Translation program 104 may obtain element details corresponding to a network identifier, regardless of the type of each element detail. Alternatively, translation program 104 may obtain some of the element details corresponding to a network identifier. For example, translation program 104 may obtain element details of types identified by a configuration setting.

Figure 4A:
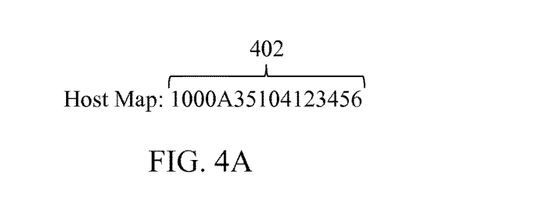
FIG. 4A depicts an illustrative embodiment of an aspect of an embodiment of the present disclosure.
Figure 4B:
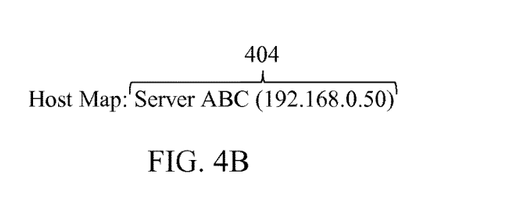
FIG. 4B depicts an illustrative embodiment of an aspect of an embodiment of the present disclosure.

In step 214, translation program 104 presents the element details. Translation program 104 may present the element details retrieved from element database 132, wherein the element details correspond to the network identifier identified by translation program 104. Translation program 104 may present the element details by modifying the obtained text. Translation program 104 may modify the obtained text based on the element details in order to present the element details. For example, translation program 104 may modify the obtained text by replacing all or some of the portion of the obtained text representing the network identifier with a portion of text representing the element details. For example, FIG. 4A depicts a portion of text that includes network identifier 402, which corresponds to a network element (e.g., network element 140*a* or 140*b*). Translation program 104 can substitute element details of the corresponding network element in place of network identifier 402 within the portion of text. FIG. 4B depicts the portion of text with element details 404 substituted for network identifier 402. Such substitution may be referred to as "in-line" substitution. Alternatively, translation program 104 may modify the obtained text by adding a portion of text representing the element details to the obtained text.

In some embodiments, translation program 104 presents the element details utilizing a mechanism indicated by a configuration setting. For example, translation program 104 may utilize in-line substitution to present the element details in response to determining that settings field 310*d* is enabled. In response to determining that settings field 310*d* is disabled, translation program 104 may utilize a different mechanism. For example, translation program 104 may utilize a modal or modeless dialog box (discussed below) to present the element details.

Figure 4C:
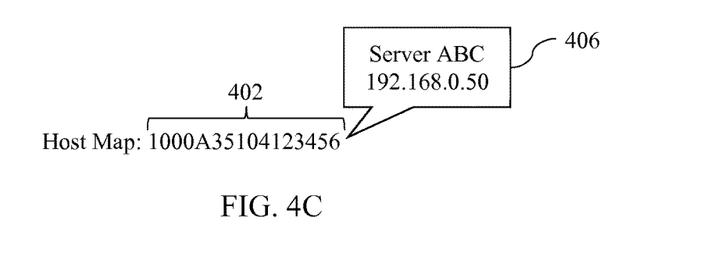
FIG. 4C depicts an illustrative embodiment of an aspect of an embodiment of the present disclosure.

In some embodiments, translation program 104 presents the element details in a UI element. Translation program 104 may present the UI element along with another UI element that displays the network identifier. Alternatively, translation program 104 may overlay the UI element over another UI element that displays the network identifier. Translation program 104 may present the element details utilizing a UI element such as a dialog box. The dialog box may modal or modeless. A modal dialog box prevents user interaction with translation program 104 until the modal dialog box receives a user interaction. A modeless dialog box does not prevent user interaction with translation program 104. FIG. 4C depicts an illustrative embodiment of element details presented by translation program 104, in accordance with an embodiment of the present disclosure. UI element 406 is a modeless dialog box. UI element 406 is associated with network identifier 402. UI element 406 contains element details for the element corresponding to network identifier 402.

In some embodiments, translation program 104 presents the element details based on a network identifier in response to receiving a user interaction corresponding to the network identifier. In various examples, the user interaction may be an interaction that selects the network identifier, interacts with the network identifier, an interaction with a context menu or other menu, or maintain a position of a pointer of a user interface device (e.g., a mouse cursor) within the boundaries of a region of a user interface corresponding to the network identifier. The user interaction may be an interaction with translation program 104. Alternatively, the user interaction may be an interaction with another program, such as browser program 106.

Figure 5:
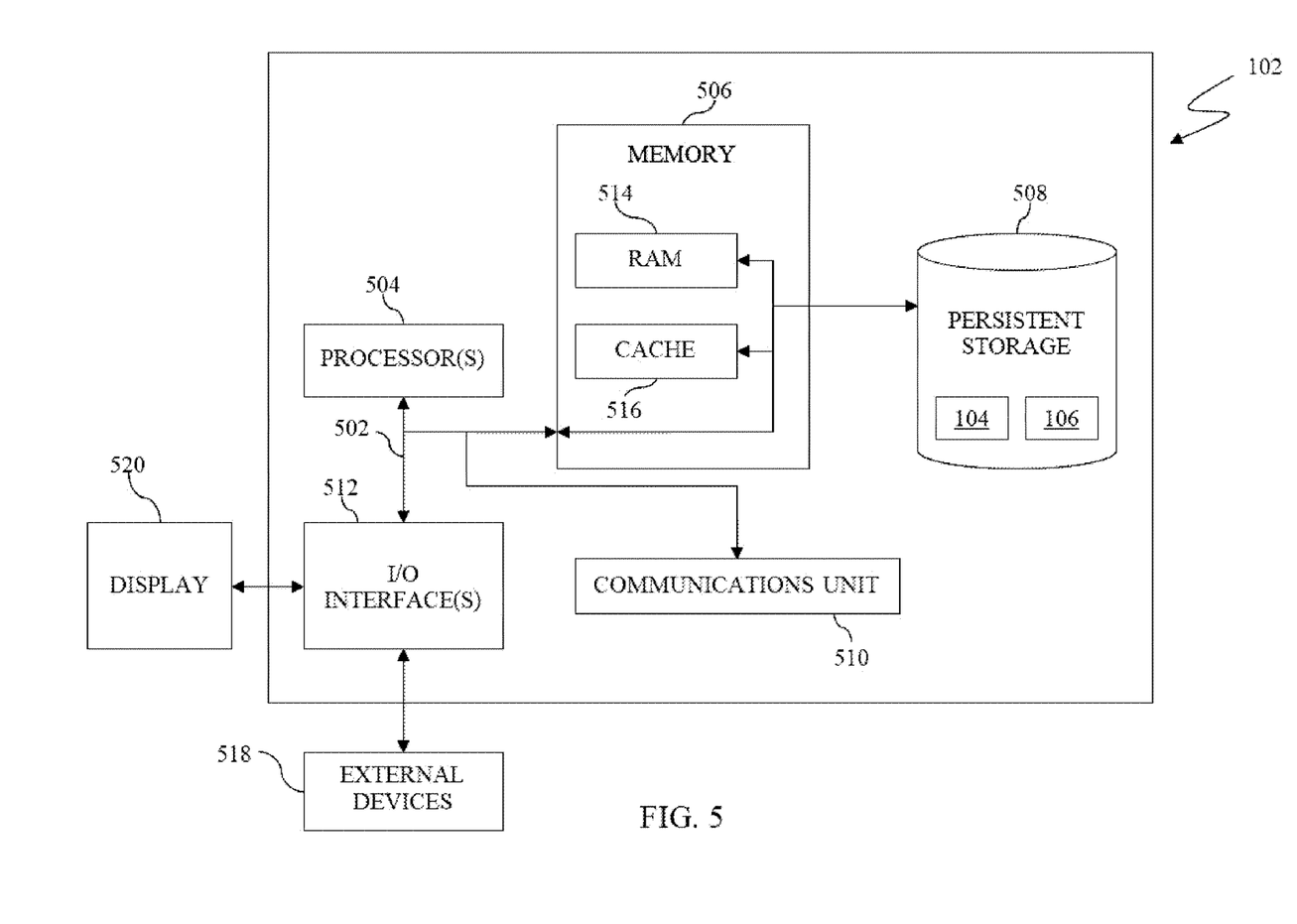
FIG. 5 depicts a block diagram of components of the computing device executing the translation program, in accordance with an embodiment of the present disclosure.

FIG. 5 depicts a block diagram of components of client device 102, in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Client device 102 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 514 and cache memory 516. In general, memory 506 can include any suitable volatile or non-volatile computer-readable storage media.

Translation program 104 and browser program 106 are stored in persistent storage 508 for execution and/or access by one or more of computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 510, in these examples, provides for communications with other data processing systems or devices, including resources of network 5XX. In these examples, communications unit 510 includes one or more network interface cards. Communications unit 510 may provide communications through the use of either or both physical and wireless communications links. Translation program 104 and browser program 106 may be downloaded to persistent storage 508 through communications unit 510.

I/O interface(s) 512 allows for input and output of data with other devices that may be connected to client device 102. For example, I/O interface 512 may provide a connection to external devices 518 such as a keyboard, keypad, a touch screen, and/or some other suitable input device. External devices 518 can also include portable computer-readable storage media such as, for example, thumb drives, portable optical or magnetic disks, and memory cards. Software and data used to practice embodiments of the present invention, e.g., translation program 104 and browser program 106, can be stored on such portable computer-readable storage media and can be loaded onto persistent storage 508 via I/O interface(s) 512. I/O interface(s) 512 also connect to a display 520.

Display 520 provides a mechanism to display data to a user and may be, for example, a computer monitor, or a television screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The term(s) "Smalltalk" and the like may be subject to trademark rights in various jurisdictions throughout the world and are used here only in reference to the products or services properly denominated by the marks to the extent that such trademark rights may exist.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of translating an identifier, the method comprising:
    receiving, by one or more processors, from a user, a selection of one type of identifier from a plurality of types of identifiers of elements of a network:
    receiving, by one or more processors, text that includes a portion of text;
    identifying the portion of text based, at least in part, on the selected type of identifier;
    identifying, by one or more processors, an identifier of an element of the network, wherein identifying the element is based, at least in part, on the identified portion of text; determining, by one or more processors, one or more details of the element, wherein determining the one or more details is based, at least in part, on the identifier;
    and modifying, by one or more processors, a presentation of the text, wherein modifying the presentation is based, at least in part, on the one or more details of the element;
    wherein other types of identifiers are unselected, and comprising:
    receiving, by one or more processors, second text that includes a portion of second text;
    identifying the portion of second text;
    determining that the portion of second text corresponds to an unselected type of identifier; and
    presenting the second text without modification in response to determining that the portion of second text corresponds to the unselected type of identifier.

2. The method of claim 1, wherein modifying the presentation of the text comprises: removing, by one or more processors, the portion of text from the text; and adding, by one or more processors, the one or more details of the element to the text.

3. The method of claim 1, wherein the selected type of identifier is selected from a group consisting of: a world-wide port name address, a media access control address, and an internet protocol address.

4. The method of claim 1, wherein determining the one or more details of the element comprises:
    accessing, by one or more processors, a database, wherein accessing the database is based, at least in part, on the identifier, wherein the database is maintained by an element management system; and
    receiving, by one or more processors, the one or more details from the database.

5. The method of claim 1, wherein modifying the presentation of the text comprises presenting the one or more element details along with the portion of text.

6. The method of claim 1, wherein the text is readable by a machine to generate a webpage, and wherein the identifier is selected from the group consisting of: a world-wide port name identifier, a media access control identifier, and an Internet protocol identifier.

7. The method of claim 1, wherein the one or more element details of the element identify at least one of the following an element selected from the group consisting of: a network port, a user-designated machine name, and an internet protocol address.

8. A computer program product comprising a computer readable storage medium having program instructions embodied therewith, the program instructions executable by a processor to cause the processor to perform a method comprising:
    receiving, by one or more processors, text that includes a portion of text; identifying, by one or more processors, an identifier of an element of a network, wherein identifying the identifier is based, at least in part, on the portion of text;
    determining, by one or more processors, one or more details of the element, wherein determining the one or more elements details is based, at least in part, on the identifier; and
    modifying, by one or more processors, a presentation of the text, wherein modifying the presentation is based, at least in part, on the one or more details of the element;
    wherein modifying the presentation of the text comprises presenting the one or more element details along with the portion of text;
    wherein other types of identifiers are unselected, and comprising:
    receiving, by one or more processors, second text that includes a portion of second text;
    identifying the portion of second text;
    determining that the portion of second text corresponds to an unselected type of identifier; and
    presenting the second text without modification in response to determining that the portion of second text corresponds to the unselected type of identifier.

9. The computer program product of claim 8, wherein modifying the presentation of the text comprises:
    removing, by one or more processors, the portion of text from the text; and adding, by one or more processors, the one or more details of the element to the text.

10. The computer program product of claim 8, wherein the method further comprises:
    receiving, by one or more processors, a selection identifying a type of identifier that corresponds to the identifier, and wherein identifying the portion of text is based, at least in part, on the selection that identifies the type of identifier.

11. The computer program product of claim 10, wherein the type of identifier is selected from the group consisting of: a world-wide port name address, a media access control address, and an internet protocol address.

12. The computer program product of claim 8, wherein determining the one or more details of the element comprises:
    accessing, by one or more processors, a database, wherein accessing the database is based, at least in part, on the identifier, wherein the database is maintained by an element management system; and receiving, by one or more processors, the one or more details from the database.

13. The computer program method of claim 1, wherein modifying the presentation of the text comprises performing an in-line substitution of the portion of the text by substituting the portion of the text with the one or more details of the element, and presenting the one or more element details along with another portion of the text that is different than the portion of the text.

14. A computer system comprising:

a memory; and a processor in communication with the memory, wherein the computer system is configured to perform a method, said method comprising:

receiving, by one or more processors, a selection of one type of identifier from a plurality of types of identifiers of elements of a network, wherein other types of identifiers remain unselected;

receiving, by one or more processors, text that includes a portion of text; identifying the portion of text based, at least in part, on the selected type of identifier;

identifying, by one or more processors, an identifier of an element of the network, wherein identifying the identifier is based, at least in part, on the identified portion of text;

determining, by one or more processors, one or more details of the element, wherein determining the one or more details is based, at least in part, on the identifier; and modifying, by one or more processors, a presentation of the text by performing an in-line substitution of the portion of the text that substitutes the portion of the text with the one or more details of the element, wherein modifying the presentation of the text is based, at least in part, on the one or more details of the element;

wherein other are unselected, and comprising:

receiving, by one or more processors, second text that includes a portion of second text;

identifying the portion of second text;

determining that the portion of second text corresponds to an unselected type of identifier; and presenting the second text without modification in response to determining that the portion of second text corresponds to the unselected type of identifier.

15. The computer system of claim 14, wherein modifying the presentation of the text comprises:

removing, by one or more processors, the portion of text from the text; and adding, by one or more processors, the one or more details of the element to the text.

16. The computer system of claim 14, wherein the type of identifier is selected from a group consisting of: a worldwide port name address, a media access control address, and an internet protocol address.

17. The computer system of claim 14, wherein determining the one or more details of the element comprises:

accessing, by one or more processors, a database, wherein accessing the database is based, at least in part, on the identifier, wherein the database is maintained by an element management system; and receiving, by one or more processors, the one or more details from the database.

18. The computer system of claim 14, wherein another portion of the text that is different than the portion of the text is presented with the one or more details of the element modifying the presentation of the text comprises presenting the one or more element details along with the portion of text.

* * * * *